United States Patent
Straetmans (10) Patent No.: US 12,215,837 B2
(45) Date of Patent: Feb. 4, 2025

(54) LED RETROFIT VEHICLE SIGNALING LAMP WITH PROJECTION LED LIGHT SOURCE, SMARTPHONE APP FOR CONTROLLING IT AND CORRESPONDING SYSTEM

(71) Applicant: LUMILEDS LLC, San Jose, CA (US)

(72) Inventor: Jean-Sebastien Straetmans, Aachen (DE)

(73) Assignee: LUMILEDS, LLC, San Jose, CA (US)

( * ) Notice: Subject to any disclaimer, the term of this patent is extended or adjusted under 35 U.S.C. 154(b) by 0 days.

(21) Appl. No.: 17/894,719

(22) Filed: Aug. 24, 2022

(65) Prior Publication Data

US 2023/0060185 A1 Mar. 2, 2023

Related U.S. Application Data (60) Provisional application No. 63/236,535, filed on Aug. 24, 2021.

(51) Int. Cl.
| | |
|---|---|
| *F21S 43/19* | (2018.01) |
| *B60Q 1/00* | (2006.01) |
| *F21S 41/25* | (2018.01) |
| *F21S 43/14* | (2018.01) |
| *F21S 43/40* | (2018.01) |

(52) U.S. Cl.
CPC ............ *F21S 43/14* (2018.01); *B60Q 1/0088* (2013.01); *F21S 41/25* (2018.01); *F21S 43/195* (2018.01); *F21S 43/40* (2018.01)

(58) Field of Classification Search
CPC ................................................ B60Q 2400/50
See application file for complete search history.

(56) References Cited

U.S. PATENT DOCUMENTS

| | | | |
|---|---|---|---|
| 8,816,840 B1 | 8/2014 | Peterson | |
| 9,931,977 B2 | 4/2018 | Youn et al. | |
| 10,928,029 B1* | 2/2021 | Woo | F21S 43/26 |
| 10,967,799 B2* | 4/2021 | Messenger | B60Q 1/247 |
| 2003/0171890 A1 | 9/2003 | Traylor | |
| 2005/0007257 A1 | 1/2005 | Rast | |

(Continued)

FOREIGN PATENT DOCUMENTS

| | | |
|---|---|---|
| JP | 2021-034309 A | 3/2021 |
| WO | 2020/237907 A1 | 12/2020 |

OTHER PUBLICATIONS

International Search Report and Written Opinion mailed Nov. 21, 2022 for PCT International Application No. PCT/US2022/041341.

*Primary Examiner* — Eric T Eide
(74) *Attorney, Agent, or Firm* — Volpe Koenig (57) ABSTRACT

An LED retrofit signaling lamp is described herein. The lamp includes a lamp body, which includes a cap, a projection part, and a burner part between the cap and the projection part. Power contacts are exposed from the cap. A projection LED light source is provided in the projection part and angled to provide a projected image near to the vehicle when activated. A signaling LED light source is provided in the burner part angled to emit non-projected light via the projection part at angles that avoid the emitted light being blocked by the projection LED light source. The projection LED light source and the signaling LED light source are electrically coupled to the power contacts in parallel to each other.

17 Claims, 5 Drawing Sheets

(56) References Cited

U.S. PATENT DOCUMENTS

| | | |
|---|---|---|
| 2005/0117364 A1 | 6/2005 | Rennick et al. |
| 2007/0222574 A1 | 9/2007 | Courts |
| 2013/0010484 A1 | 1/2013 | Son et al. |
| 2016/0257243 A1* | 9/2016 | Son .................... B60Q 1/324 |
| 2017/0210282 A1* | 7/2017 | Rodriguez Barros . B60Q 1/324 |
| 2017/0259731 A1* | 9/2017 | Son ..................... B60Q 1/48 |
| 2018/0022269 A1* | 1/2018 | Mügge ................ B60Q 1/381 |
| | | 362/509 |
| 2019/0031099 A1* | 1/2019 | Kimura ................ E01H 5/098 |
| 2019/0322209 A1* | 10/2019 | Sugiyama ............. F21S 43/26 |
| 2019/0359118 A1 | 11/2019 | Spenner et al. |

\* cited by examiner (a)

(b)

prior art

LED RETROFIT VEHICLE SIGNALING LAMP WITH PROJECTION LED LIGHT SOURCE, SMARTPHONE APP FOR CONTROLLING IT AND CORRESPONDING SYSTEM

CROSS REFERENCE TO RELATED APPLICATIONS

This application claims the benefit of U.S. Provisional Patent Application No. 63/236,535, filed on Aug. 24, 2021, which is incorporated by reference as if fully set forth.

BACKGROUND

Light emitting diodes (LEDs) more and more replace older technology light sources, such as halogen, gas-discharge, and Xenon, lamps (also referred to herein as conventional lamps) due to superior technical properties, such as energy efficiency and lifetime. This may particularly apply to vehicular signaling functions because of the limited required luminous power. Considering the vast installation base of conventional lamps, providing so-called LED retrofit lamps (also referred to herein as LED retrofits) more or less one-to-one replacing conventional lamps while allowing continued use of other system components like optics (e.g., reflectors and lenses) and luminaires, may be of great economic interest.

SUMMARY

An LED retrofit signaling lamp is described herein. The lamp includes a lamp body, which includes a cap, a projection part, and a burner part between the cap and the projection part. Power contacts are exposed from the cap. A projection LED light source is provided in the projection part and angled to provide a projected image near to the vehicle when activated. A signaling LED light source is provided in the burner part angled to emit non-projected light via the projection part at angles that avoid the emitted light being blocked by the projection LED light source. The projection LED light source and the signaling LED light source are electrically coupled to the power contacts in parallel to each other.

BRIEF DESCRIPTION OF THE DRAWINGS

A more detailed understanding can be had from the following description, given by way of example in conjunction with the accompanying drawings wherein.

DETAILED DESCRIPTION

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present disclosure. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures, unless explicitly stated otherwise. It will be understood that these terms are intended to encompass different orientations of the device in addition to the orientation depicted in the figures.

In the meantime, for many car types, LED retrofits are on the market legally replacing the original conventional lamps with superior light technical properties, such as brighter and more bluish light, enhanced lifetime, and reduced energy consumption. However, functionally, the LED retrofits only offer a one-to-one replacement for the original conventional lamps. For vehicle signaling lamps, such as turn signal and brake lamps, with an LED retrofit, one still has only the previous functionalities, such as flashing turn signals and continuous brake light on depressing the brake pedal. Compared to modern new cars and the concept studies presented on fairs and conferences for future cars, this means that, even with an LED retrofit, the car still lacks enhanced warning, information sharing, and styling functionalities, such as projecting the turning direction on the road, such as in the shape of an arrow, a pattern of hooks, etc.

Such restrictions appear mandatory as, with LED retrofitting, one replaces only a former light source with another new light source, thus, regardless of which type of light source is used, that light source is still a functionally equivalent light source. The vehicle driver appears to be restricted to the mere capability of switching on and off the replaced light source. Thus, if one desires enhanced functionality, a larger part of the complete vehicle light would typically need to be replaced.

Figure 1:
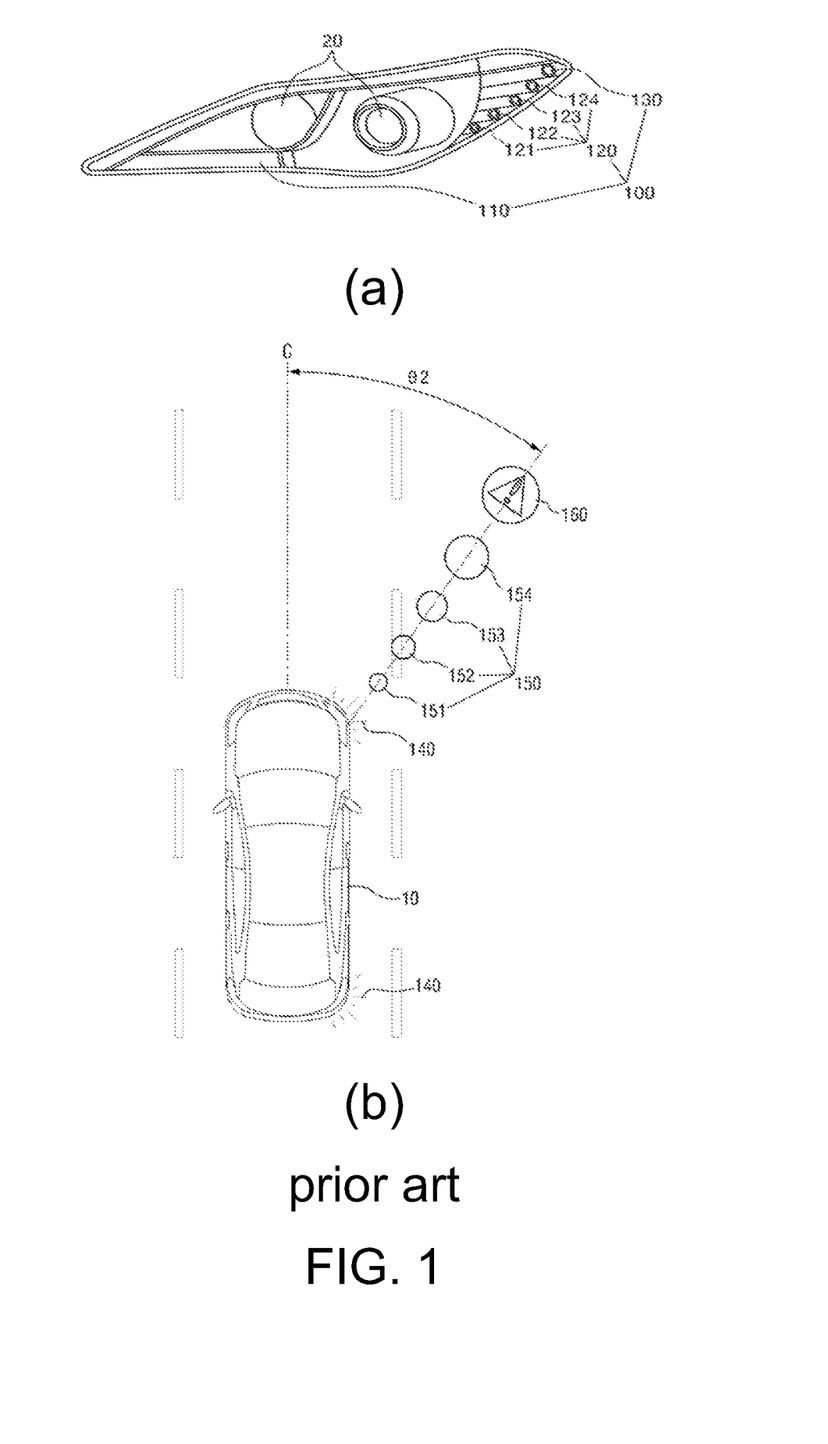
FIG. 1 is a diagram of a vehicle headlamp ensemble comprising image projection units.

FIG. 1 is a diagram of a vehicle headlamp ensemble comprising image projection units and is related to U.S. Patent Appln. Pub. No. 20130010484A1, which is incorporated by reference herein as if fully set forth. In part (a) of FIG. 1, a complete headlight unit is shown in schematic perspective view. In the example illustrated in part (a) of FIG. 1, the headlight unit includes headlamps 20 (e.g., high beam, low beam, etc.) and a complex turn signal light 100 made up of three lamp units 110, 120, 130. Each lamp unit 110, 120, 130 may itself include several separate lamps. First lamp unit 110 may be a standard flashing turn signal lamp generating a standard blinking pattern 140. The rear turn signal lamp may have only this standard functionality. The second lamp unit 120 may include 4 separate light source parts 121, 122, 123 and 124 with the light emitting area increasing and inclination angle to the ground decreasing from 121 to 124. The third lamp unit 130 may be specially formed and may have the lowest inclination angle to the ground. Part (b) of FIG. 1 shows a vehicle 10 in which the headlight unit in part (a) may be incorporated as well as a schematic bird's eye view of a beam pattern on the road that may largely be generated, for example, at angle $\theta_2$ from the car middle line C with all lamp units of the turn signal lamp 100 operating. For example, a blinking pattern 140 may be generated by lamp unit 110, and a pattern 150 of circles 151, 152, 153, 154 may be generated by lamp unit 120. A warning pattern 160 may be generated by lamp unit 130.

A turn signal lamp, such as the turn signal lamp 100, is a bulky conglomerate made up of many different separate parts. A turn signal lamp such as this may not be retrofitted into an existing vehicle headlight but would require a complete redesign of the complete headlight for use in this manner.

Figure 2:
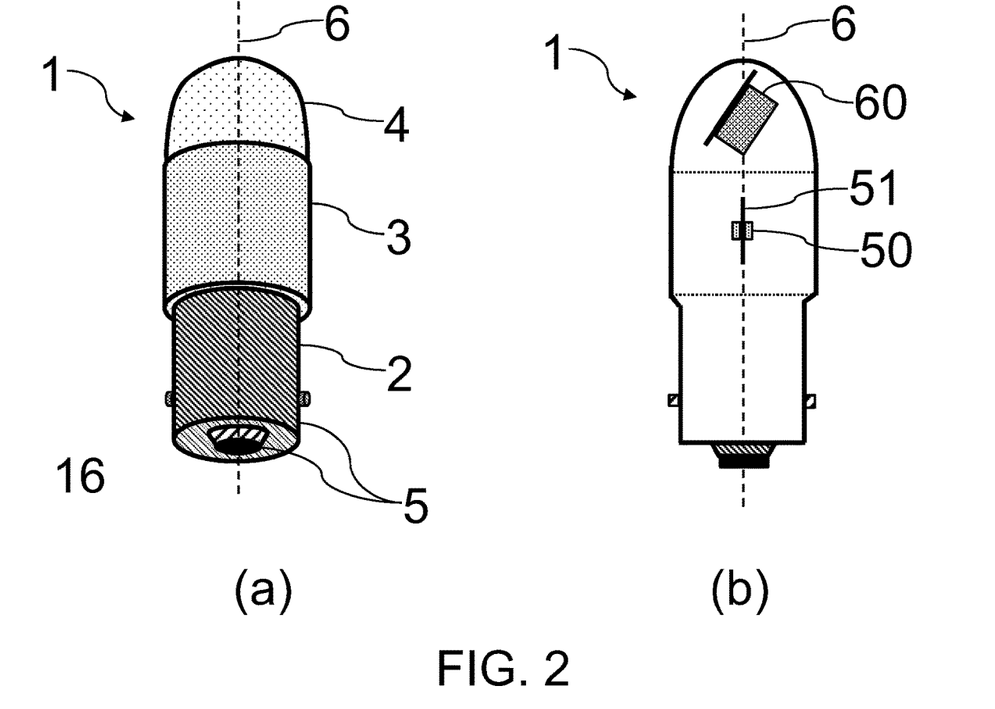
FIG. 2 is a schematic view of an example LED retrofit signaling lamp.

FIG. 2 is a schematic view of an example LED retrofit signaling lamp 1. Part (a) of FIG. 2 shows in perspective view the outer shape of an LED retrofit signaling lamp 1. In the example illustrated in part (a) of FIG. 2, the LED retrofit signaling lamp 1 includes a cap 2 exposing electrical power contacts 5, a signaling part 3, and a projection part 4 arranged along a longitudinal axis 6 of the LED retrofit signaling lamp 1. Typically, the cap 2 will have electrically conducting metal as outer material serving as power contacts 5, which may be separated from each other by plastics (indicated as hatched region in part (a) of FIG. 2). The envelope of the burner parts 3 and 4 typically will be transparent and may be formed from glass. The boundaries between the parts 2, 3, 4 are indicated for visibility by diameter differences, but they need not exist in practical embodiments.

Part (b) of FIG. 2 schematically shows, in sectional view in the drawing plane of part (a) through the longitudinal axis 6, some inner details of the LED retrofit signaling lamp 1. Discernible are signaling LED light sources 50 and a projection LED light source 60. Part (b) of FIG. 2 shows two signaling LED light sources 50 mounted opposite to each other on a signaling carrier 51, such as a vertical plate having a plane that extends transverse to the drawing plane. However, just a single or more than two signaling LED light sources, such as 3 or even 12 such light sources on a triangular or 12-sided stem as carrier 51, are also within the scope of the embodiments described herein. Alternatively, instead of the carrier 51 being a vertically oriented plate, the signaling LED light sources 50 may be attached to a horizontally oriented carrier 51 or to any inclination in between vertical and horizontal. Further optical elements may be added as parts of the signaling LED light sources to increase light outcoupling for the signaling part of the LED retrofit signaling lamp 1.

Figure 3:
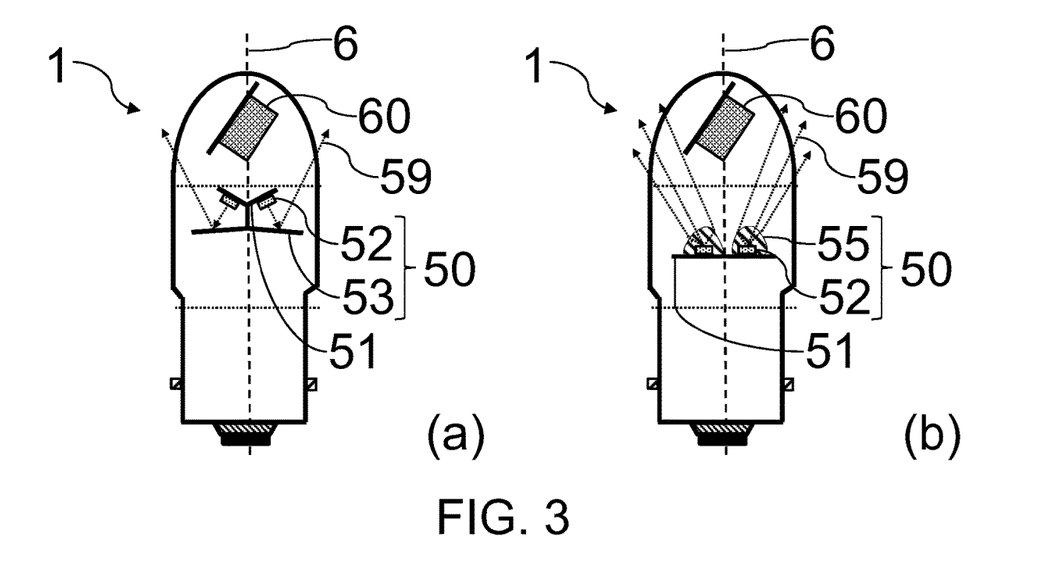
FIG. 3 is a schematic sectional view showing more detail of embodiments of a signaling part of an example LED retrofit signaling lamp.

FIG. 3 is a schematic sectional view showing more detail of embodiments of a signaling part of an example LED retrofit signaling lamp. Part (a) of FIG. 3 shows, as one non-limiting example, in a schematic sectional view similar to part (b) of FIG. 2, signaling LEDs 52 mounted on carrier plates 51 slightly inclined upwards from the horizontal where reflector plates 53, forming signaling reflectors 53, support in outcoupling the light for signaling in only slight inclination to the longitudinal axis 6 (see the schematically indicated ray direction 59). In a situation where the LED retrofit signaling lamp 1 is mounted horizontally (or slightly inclined to the ground) to a vehicle with its cap 2 pointing to the inside of the vehicle, such arrangement of a signaling LED light source 50 including the signaling LEDs 52 and the reflector plates 53 may yield an advantageous signaling light beam largely avoiding being screened by the projection part 4 and with a mainly horizontal (or slightly inclined to the ground) illumination direction.

In part (a) of FIG. 3, two signaling LED light sources 50 are shown mounted in a mirror-symmetric fashion on carrier 51. Visible are one signaling LED 52 per signaling LED light source 50. However, carrier 51 and reflector plates 53 may extend vertical to the drawing plane near to the full diameter of the signaling part 3 of the LED retrofit signaling lamp 1. Thus, they easily may offer space for several (e.g., three) signaling LEDs 51 in a row per signaling LED light source 50. Additionally, instead of two inclined mirror-symmetric LED light sources 50, there may be more (e.g., three or more) light sources arranged in an n-fold rotationally symmetric pattern with n being the number of LED light sources 50. Further, edges between the carrier plates 51 of the LED light sources 50 may not need to be sharp, but there may be a single conical carrier plate 51 onto which the signaling LEDs 51 are mounted. In the same way, the corresponding reflector plates 53 may unite into a single conical reflector plate 53.

Part (b) of FIG. 3 shows, as a further example, signaling LED light sources 50 that include signaling refractive components 55 covering the signaling LEDs 52 to collimate the light from the signaling LEDs 52 to an only slight inclination versus the longitudinal axis 6 while avoiding being blocked by the projecting part 4. Such refractive components 55 may, for example, be realized by overmolding signaling LEDs 52 with an appropriately designed lens 55.

Figure 4:
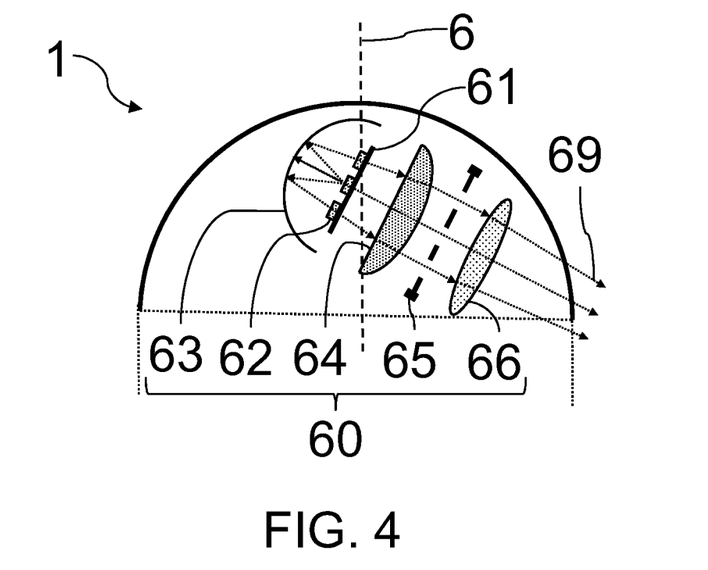
FIG. 4 is a schematic projection view showing more detail of an embodiment of the projection part of an example LED retrofit signaling lamp.

FIG. 4 is a schematic projection view showing more detail of an embodiment of the projection part of an example LED retrofit signaling lamp, which shows how the projection LED light source 60 may be realized. Visible are 3 projection LEDs 62 mounted on a projection carrier 61, being plate like in the illustrated example. Projection reflector 63 may receive light emitted by projection LEDs 62 and revert its direction. Not visible in the figure, the LEDs 62 on carrier 61 and projection reflector 63 may not be in the drawing plane but, for example, one may be in front of and the other behind the drawing plane. This may avoid the light reverted by reflector 63 being blocked by the LEDs 62 and carrier 61. In other words, unlike FIG. 3, FIG. 4 is not a sectional but a projection view (looking through the LED retrofit signaling lamp). For better visibility, in FIG. 4 only the projection part 4 of the LED retrofit signaling lamp 1 is shown.

After reflection at reflector 63 and passing, in the depth direction transverse to the drawing plane, the LEDs 62 on carrier 61, projection rays 69 (the light emitted by the projection LEDs 62) may be collimated by projection condenser 64. Projection image forming component 65 may shape the image that is finally projected on the road by projection lens 66. In FIG. 4, the image forming component 65 is indicated as a simple hole mask (e.g., with stripes cut-out from a black mask extending (transverse to the drawing plane)). In other words, the image forming component 65 may be realized as a slitted plate to form a stripe pattern on the road.

In FIG. 4, projection LED 62, projection reflector 63, projection condenser 64, projection image forming component 65, and projection lens 65 may together form the projection LED light source 60. While FIG. 4 shows projection carrier 61 just as carrier for LEDs 62, such carrier 61 may be formed in a kind of framing component functioning as a holder also for the remaining components of the projection LED light source 60.

As the projection part 4 of the LED retrofit signaling lamp 1, typically, is thought for projecting information items for the driver and/or other traffic participants near the vehicle, advantageously, the projection LED light source 60 may be mounted to the projection carrier 61 in a slight inclination towards the horizontal. For example, an inclination of 27° may yield an information pattern on the road at a distance of around 2 m from the signaling light of the vehicle.

Alternatively to the multiple part system of FIG. 4 for the projection LED light source 60, such light source may be realized, for example, with a refractive component (a lens) overmolded on the projection LEDs 62. The image forming component may, for example, be realized by applying a masking pattern to the refractive component, for example by a CVD technique. Similar considerations may apply here to the refractive component of the projection part 4 as described above in connection with the signaling part 3.

Electrically, in an LED retrofit signaling lamp such as described herein, the signaling and projection LED light sources 50, 60 may be connected parallel to each other to the power contacts 5. Accordingly, without further measures, the signaling and projection LED light sources may be on and off each time simultaneously. Such might be a preferred activation mode of an LED retrofit signaling lamp, such as for tying a standard blinking turn signal to a flashing direction-change indicating arrow on the road. In another embodiment, however, an LED retrofit signaling lamp may further include an interface for receiving control signals for an activation mode of one or both of the signaling and the projection LED light sources and with a controller for setting the activation mode of one or both of the signaling and the projection LED light sources according to the control signals.

Figure 5:
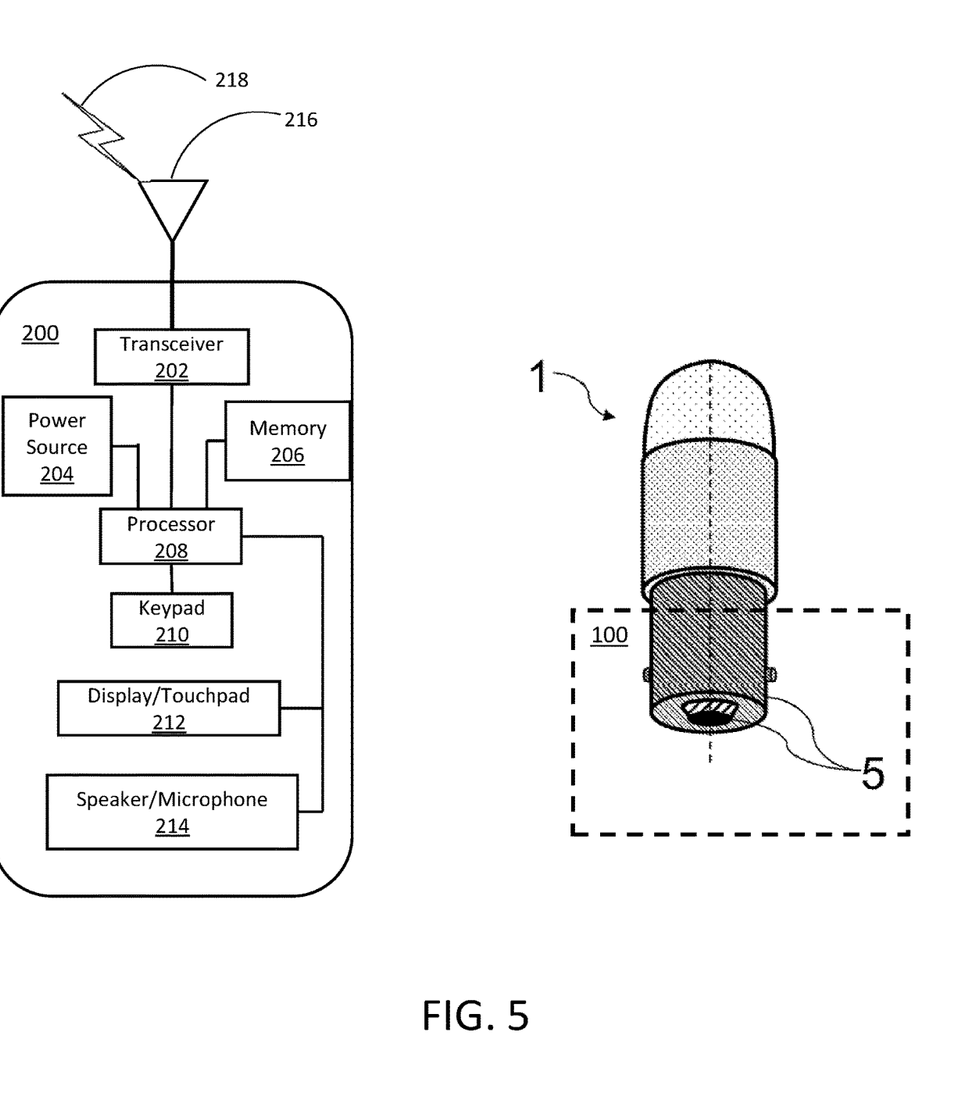
FIG. 5 is a system diagram of an example system including an LED retrofit signaling lamp and a system controller.

FIG. 5 is a system diagram of an example system including an LED retrofit signaling lamp (in this example, the LED retrofit signaling lamp 1 of FIG. 2) and a system controller. In the example illustrated in FIG. 5, the LED retrofit signaling lamp 1 includes an interface 100 for receiving control signals for an activation mode. In the illustrated example, the interface includes the power contacts 5. The interface 100 also includes some type of receiver (not shown) for receiving control signals from the controller. For example, the receiver may be configured to receive signals from an external controller. The interface may also include some type of controller for controlling the driver to operate the various LED lights (e.g., signaling and projection) based on the received control signals. In some embodiments, the controller may be external to the interface 100 or even external to the LED retrofit signaling lamp 1 and may be on the same board or a separate board from any of the LED light sources and/or the receiver. In some embodiments, the receiver may be an antenna configured to receive RF signals. In some embodiments, the receiver may be an emitter/detector configured to receive IR, UV, or visible light signals, for example. In some embodiments, the receiver may be configured to transmit and/or receive both RF and light signals. It will be appreciated that the transmit/receive element 122 may be configured to transmit and/or receive any combination of wireless signals. In some embodiments, the receiver may be a transceiver, configured to both transmit and receive signals and may be any of the types of devices described with respect to the receiver. While a box is shown around a portion of the LED retrofit signaling lamp 1 that extends outside of the lamp body, all portions of the LED retrofit signaling lamp 1, including the interface 100, may be contained within the lamp body or some portions may be external and some internal.

In FIG. 5, the controller is depicted as part of a wireless device 200. In the illustrated example, the wireless device 200 includes a processor 208 that is communicatively coupled to a transceiver 202, a power source 204, at least one memory 206, a keypad 210, a display/touchpad 212 and a speaker/microphone 214. As shown, the transceiver 202 may be communicatively coupled to an antenna 216, which may be configured to transmit and/or receive control signals 218, which may be received by the retrofit signaling lamp 1 via the interface 100. As mentioned above, the transceiver 202 may be communicatively coupled to the antenna 216, which may be configured to transmit and/or receive RF signals. In embodiments, the transceiver 201 may be an emitter/detector configured to transmit and/or receive IR, UV, or visible light signals, for example. In embodiments, the transceiver 202 may be configured to transmit and/or receive both RF and light signals. It will be appreciated that the transceiver 202 may be configured to transmit and/or receive any combination of wireless signals.

The processor 208 may be coupled to, and may receive user input data from, the speaker/microphone 214, the keypad 210, and/or the display/touchpad 212 (e.g., a liquid crystal display (LCD) display unit or organic light-emitting diode (OLED) display unit). The processor 208 may also output user data to the speaker/microphone 214, the keypad 210, and/or the display/touchpad 212. In addition, the processor 208 may access information from, and store data in, any type of suitable memory, such as the at least one memory 206. The at least one memory 206 may include random-access memory (RAM), read-only memory (ROM), a hard disk, any other type of memory storage device, a subscriber identity module (SIM) card, a memory stick, a secure digital (SD) memory card, and the like. In other embodiments, the processor 208 may access information from, and store data in, memory that is not physically located on the wireless device 200, such as on a server or a home computer (not shown).

The processor 208 may receive power from the power source 204 and may be configured to distribute and/or control the power to the other components in the wireless device 200. The power source 204 may be any suitable device for powering the wireless device 200. For example, the power source 204 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may further be coupled to other peripherals (not shown), which may include one or more software and/or hardware modules that provide additional features, functionality and/or wired or wireless connectivity. For example, the peripherals may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

An LED driver (not shown) may be part of, or separate from, the LED retrofit signaling lamp 1 (e.g., on the same board within the LED retrofit signaling lamp, on a different board within the LED retrofit signaling lamp or external to the LED retrofit signaling lamp. It may be contained within the cap 2 along with, for example, the power contacts 5 and a receiver/transceiver for receiving the control signals 218 from the controller. The LED driver may be enabled to set all or at least some of the possible activation modes of the signaling and the projection LED light sources. Such activation modes may, for example, include turning off the functionality (no operation), continuous operation (using steady instead of flashing direction-change indicating arrows), and the already mentioned flashing operation. The driver may, for example, decide to just use the standard blinking light as a turn indicator or just the standard brake light instead of adding a projected warning on the road behind the vehicle. The driver may, additionally or alternatively, just use the projection functionality by turning off the signaling part of the LED retrofit signaling lamp, which may be useful to signal a more specific information to another driver for, for example, agreeing on mutual movement on a parking lot.

In some embodiments of an LED retrofit signaling lamp, the image forming component may allow selecting between various images or even allow for editing/setting the image content. Then, the activation mode may encompass setting the image by appropriate control signals. The image forming component, in this case, may have display characteristics allowing free editing or switching between preset content. Because of their energy efficiency, e-ink displays may be advantageous here.

Control signals may be transmitted as switching on/off sequences of the power switch of the vehicle signaling light. For example, the interface for receiving the control signals may include the power contacts 5 of an LED retrofit signaling lamp, as shown in FIG. 5. The controller (e.g., wireless device 200 or some other internal or external controller) may interpret the switching sequences for setting the activation modes of the signaling and/or projection LED light sources. For example, an LED retrofit signaling lamp may always switch on in a default activation mode, such as with the signaling and projection light sources operating simultaneously. After a pause after switch-on, a rapid sequence of switching off and on again may toggle between various activation modes. For example, a first rapid switching on/off may switch off the projection light source, and a further rapid switching off/on may switch it on again. Alternatively, instead of starting in a default activation mode, an LED retrofit signaling lamp may memorize its last activation mode before having been switched off and switch on again in the memorized mode. Alternatively or additionally to using switching sequences as control signals, such switching signals may be explicitly sent to a radio interface of an LED retrofit signaling lamp. Such may be done by using a smartphone application, such as by using easily understandable pictograms for the various activation modes. Such smartphone app also belongs to the scope of this disclosure.

Figure 6:
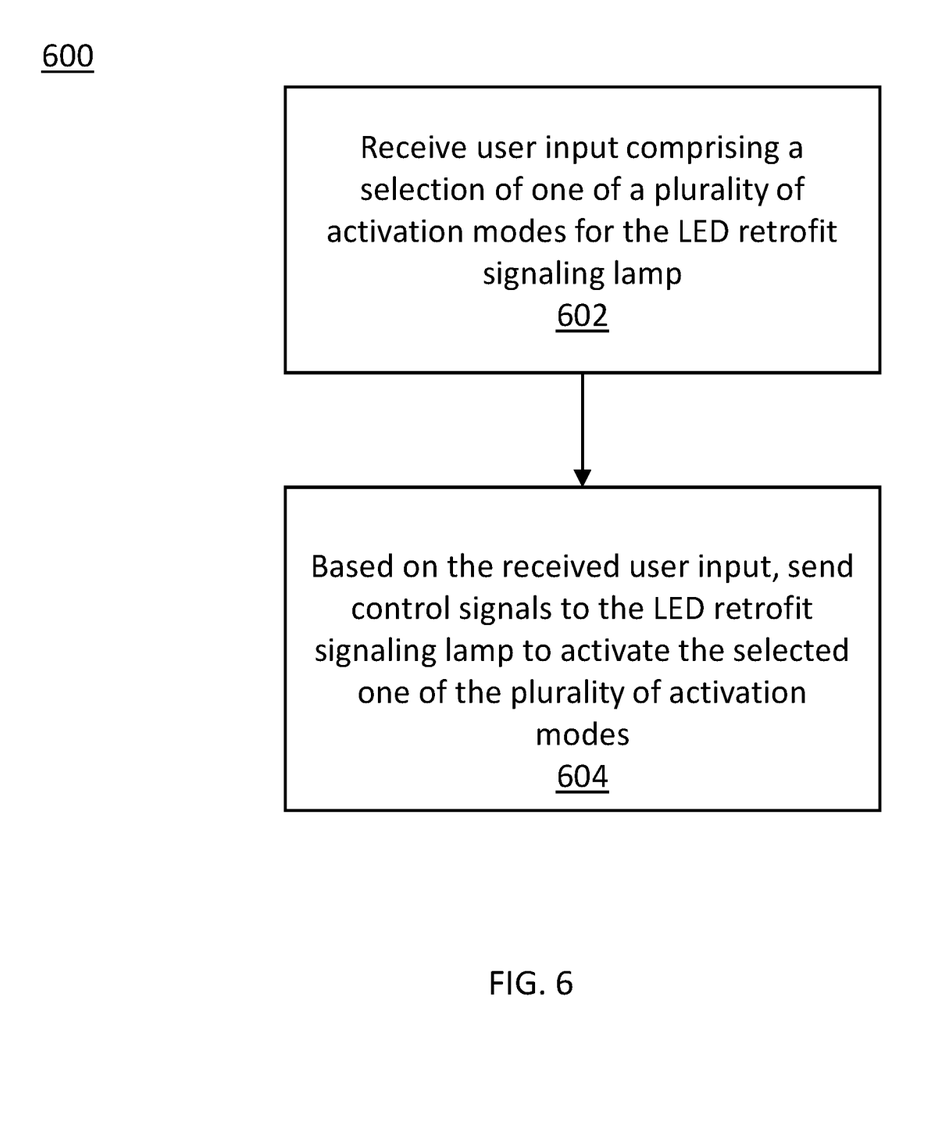
FIG. 6 is a flow diagram of an example method of operating an LED retrofit signaling lamp.

FIG. 6 is a flow diagram of an example method 600 of operating an LED retrofit signaling lamp. In the example illustrated in FIG. 6, the method includes receiving user input comprising a selection of one of a plurality of activation modes for an LED retrofit signaling lamp (602). The plurality of activation modes may include at least no operation of the signaling LED light source, flashing operation of the signaling LED light source, continuous operation of the LED light source, and an image to be projected by the projection LED light source. The method may also include sending control signals to the LED retrofit signaling lamp to activate the selected one of the plurality of activation modes based on the received user input (604).

In embodiments, the control signals comprise signals that cause power contacts of the LED retrofit signaling lamp to turn on and off in a specified sequence that indicates the selected activation. The mode image to be projected by the projection LED light source may comprise a plurality of selectable images to be projected by the projection LED light source.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a wireless device, such as a cellular telephone or tablet PC.

Having described the embodiments in detail, those skilled in the art will appreciate that, given the present description, modifications may be made to the embodiments described herein without departing from the spirit of the disclosed concept. Therefore, it is not intended that the scope of the disclosure be limited to the specific embodiments illustrated and described, but the scope of protection is only limited by the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:
1. A light-emitting diode (LED) retrofit signaling lamp comprising:
  a lamp body comprising a cap, a projection part, and a burner part between the cap and the projection part;
  power contacts exposed from the cap;

a projection LED light source in the projection part and angled to provide a projected image on the street near to the vehicle when activated; and a signaling LED light source in the burner part angled to emit non-projected light at least via the projection part, the projection LED light source and the signaling LED light source being electrically coupled to the power contacts in parallel to each other.

2. The LED retrofit signaling lamp according to claim 1, wherein the projection LED light source comprises:
a projection LED,
a projection reflector,
a projection condenser,
a projection image forming component, and
a projection lens.

3. The LED retrofit signaling lamp according to claim 1, wherein the projection image forming component comprises a slitted plate.

4. The LED retrofit signaling lamp according to claim 1, further comprising:
a driver; and
a controller,
wherein the controller is configured to control the driver to operate the signaling LED light source as at least one of a turn signal or a brake signal.

5. The LED retrofit signaling lamp according to claim 1, wherein the signaling LED light source comprises a signaling LED and a signaling reflector.

6. The LED retrofit signaling lamp according to claim 5, wherein the signaling LED and the signaling reflector are each mounted inclined to a longitudinal axis of the LED retrofit signaling lamp.

7. The LED retrofit signaling lamp according to claim 1, wherein the signaling LED light source comprises:
a signaling LED, and
a signaling refractive component.

8. The LED retrofit signaling lamp according to claim 1, further comprising:
an interface configured to receive control signals for an activation mode for one or both of the signaling LED light source and the projection LED light source, and
a controller configured to set the activation mode of one or both of the signaling and the projection LED light sources according to the control signals.

9. The LED retrofit signaling lamp according to claim 1, wherein the activation mode of the signaling LED light source comprises one of no operation, continuous operation, or flashing operation.

10. The LED retrofit signaling lamp according to claim 1, wherein:
the projection LED light source comprises a projection image forming component, and
the activation mode of the projection LED light source comprises setting an image formed by the projection image forming component.

11. The LED retrofit signaling lamp according to claim 1, wherein the interface for receiving the control signals comprises the power contacts.

12. The LED retrofit signaling lamp according to claim 1, wherein the controller is configured to interpret sequences of power on and off at the power contacts as the control signals.

13. The LED retrofit signaling lamp according to claim 1, wherein the interface is configured to receive the control signals via radio.

14. An automotive lighting system comprising:
a light-emitting diode (LED) retrofit signaling lamp comprising:
a lamp body comprising a cap, a projection part, and a burner part between the cap and the projection part;
power contacts exposed from the cap,
a projection LED light source in the projection part and angled to provide a projected image on the street near to the vehicle when activated, and
a signaling LED light source in the burner part angled to emit non-projected light via the projection part at angles that avoid the emitted light being blocked by the projection LED light source,
the projection LED light source and the signaling LED light source being electrically coupled to the power contacts in parallel to each other; and
a control device configured to send control signals to the LED retrofit signaling lamp to activate one of a plurality of activation modes for the LED retrofit signaling lamp.

15. The automotive lighting system of claim 14, wherein the plurality of activation modes comprise at least no operation of the signaling LED light source, flashing operation of the signaling LED light source, continuous operation of the LED light source, and an image to be projected by the projection LED light source.

16. The automotive lighting system of claim 14, wherein the control device is a wireless device.

17. The automotive lighting system of claim 16, wherein the wireless device comprises a non-transitory computer readable storage medium storing instructions for controlling the LED retrofit signaling lamp.

* * * * *